United States Patent [19]

Kimura et al.

[11] Patent Number: 5,687,256
[45] Date of Patent: Nov. 11, 1997

[54] IMAGE CODING AND DECODING APPARATUSES WITH VARIABLE BLOCK BOUNDARIES

[75] Inventors: Shunichi Kimura; Yutaka Koshi; Koh Kamizawa, all of Kanagawa, Japan

[73] Assignee: Fuji Xerox Co., Ltd., Tokyo, Japan

[21] Appl. No.: 468,390

[22] Filed: Jun. 6, 1995

Related U.S. Application Data

[63] Continuation of Ser. No. 198,777, Feb. 18, 1994, abandoned.

[30] Foreign Application Priority Data

Feb. 19, 1993 [JP] Japan .................... 5-030576

[51] Int. Cl.[6] ............................................. G06K 9/36
[52] U.S. Cl. ............................... 382/232; 382/243
[58] Field of Search ......................... 382/232, 239, 382/240, 243, 248; 358/432, 433; 348/395, 420

[56] References Cited

U.S. PATENT DOCUMENTS

| | | | |
|---|---|---|---|
| 4,751,742 | 6/1988 | Meeker | 382/43 |
| 4,920,426 | 4/1990 | Hatori et al. | 358/433 |
| 5,021,891 | 6/1991 | Lee | 358/432 |
| 5,126,857 | 6/1992 | Watanabe et al. | 358/433 |
| 5,187,755 | 2/1993 | Aragaki | 358/432 |
| 5,228,098 | 7/1993 | Crinon et al. | 382/56 |
| 5,253,078 | 10/1993 | Balkanski et al. | 358/433 |

OTHER PUBLICATIONS

H.C. Reeve III et al., "Reduction of Blocking Effect In Image Coding," ICASSP 83, Boston, pp. 1212–1215, 1983.
H.S. Malvar et al., "The LOT: Transform Coding Without Blocking Effects", IEEE Transactions on ASSP, vol. 37, No. 4, pp. 553–559, Apr. 1989.
Yasuda, "International Standard of Multi–Media Coding" pp. 14–47, Maruzen Co., Ltd. (Japanese Language).

*Primary Examiner*—Jose L. Couso
*Attorney, Agent, or Firm*—Finnegan, Henderson, Farabow, Garrett & Dunner, L.L.P.

[57] ABSTRACT

A block boundary information analyzing circuit extracts block boundary information from an input image signal. A blocking circuit divides the input image signal into block images while changing block boundary positions based on the block boundary information every time a coding operation is performed. A discrete cosine transform coder codes the respective block images. A block boundary information adding circuit adds boundary information to the coded image information.

3 Claims, 10 Drawing Sheets

ONE BLOCK IMAGE
ONE PIXEL

BLOCKING

IMAGE CODING AND DECODING APPARATUSES WITH VARIABLE BLOCK BOUNDARIES

This application is a continuation of application Ser. No. 08/198,777 filed Feb. 18, 1994, now abandoned.

BACKGROUND OF THE INVENTION

The present invention relates to an image signal coding apparatus and an image signal decoding apparatus used in an image transmitting apparatus such as a facsimile machine, a digital copier or printer having a memory system, an image filing system and other apparatuses.

Among image coding schemes is the block coding scheme in which an image is divided into predetermined blocks and non-reversible coding is performed on a block-by-block basis. Example of the block coding are the orthogonal transform coding, block approximation coding and vector quantizing. In these coding schemes, each block image is subjected to non-reversible coding completely independently of the others. As a result, there occur discontinuities in boundaries between adjacent blocks of a decoded image, i.e., blocking effects.

To reduce blocking effects, the overlap scheme and the filtering scheme was proposed in H. C. Reeve III et al., "Reduction of Blocking Effect in Image Coding," ICASSP '83, Boston, pp. 1212-1215, 1983.

Further, the LOT (lapped orthogonal transform) scheme was proposed in H. S. Malvar et al., "The LOT: Transform Coding Without Blocking Effects," IEEE Transactions on ASSP, Vol. 37, No. 4, pp. 553-559, April 1989.

As shown in FIG. 12, in the overlap scheme, an image us blocked (segmented) so that resulting block images are overlapped and pixels in the vicinity of boundaries of adjacent block images are coded plural times. In a decoding operation, the pixels coded plural times are decoded also plural times and average values are output. In the example of FIG. 12, each block consists of 5×5 pixels and blocking is performed so that an image of 9×9 pixels has one-pixel overlap lines (hatched in the left part of FIG. 12). Hatched portions (see the right part of FIG. 12) of each block image are coded in an overlapped manner. The overlapped coding reduces blocking effects because of reference to pixel information of adjacent block images.

As shown in FIG. 13, in the filtering scheme, an image obtained as a result of coding by a block coding section 51 and decoding by a decoding section 52 is passed through a lowpass filter 53 to attenuate its high-frequency components. The filtering scheme reduces blocking effects by removing high-frequency components, paying attention to the fact that blocking effects are mainly caused by high-frequency components of an image. It is noted that the sections 51 and 52, which are enclosed by a dashed line, perform usual coding and decoding operations.

The LOT scheme is intended to remove blocking effects in a discrete cosine transform type coding scheme. As shown in FIGS. 14(a) and 14(b), a LOT circuit is constituted such that an additional circuit is added to discrete cosine transform (DCT) circuits. In FIG. 14(a), reference symbols 61a and 61b denote a pair of discrete cosine transform circuits; 62, input image signals; 63, output codes; and 64, an arithmetic circuit. 2N input image signals 62 are supplied to the pair of discrete cosine transform circuits 61a and 61b, which determine transform coefficients. Part of the transform coefficients obtained by one discrete cosine transform circuit and the other part obtained by the other discrete cosine transform circuit are added together to produce N outputs. Part of the N outputs are supplied to the arithmetic circuit 64. In each of arithmetic sections 64a–64c shown in FIG. 14(b), the following operation is performed:

$Z = x \cdot \cos\theta_i - y \cdot \sin\theta_i$ $W = x \cdot \sin\theta_i - y \cdot \cos\theta_i$ to thereby produce the N output codes 63. In the above equations, x and y are input signal to each arithmetic section, Z and W are output signals from each arithmetic section, and $\theta_i$ is an angle determined by an autocorrelation function and a block length.

The N output codes 63 are obtained from the 2N input image signals 62, which means that the output codes of each block are obtained by referring to the results of the discrete cosine transform of the adjacent blocks (overlapped blocking).

In the LOT scheme, in which a matrix of transform coefficients includes elements for edge point processing, each matrix encompasses a plurality of blocks. Thus, blocking effects are reduced.

However, the above-described conventional techniques have the following problems.

In the overlap scheme, in which image information is coded with overlapping, the amount of processing in the coding operation increases compared to non-overlapping schemes.

For example, where the coding scheme employs the discrete cosine transform, $2N^3$ multiplying and adding operations need to be performed to transform pixels of an N×N rectangular block. If the overlapping width is one pixel, the amount of processing increases by $2(N+1)^3 - 2N^3$. Further, the overlapped coding necessitates transmission of redundant codes, resulting in a lowered coding efficiency.

In the filtering scheme, the amount of processing is increased and the circuit needs additional elements. Further, the removal of high-frequency components deteriorates reproduction performance.

In the LOT scheme, the circuit configuration becomes complex because circuit elements are added to the discrete cosine transform circuits, resulting in an increase of the amount of processing. Further, the LOT scheme should necessarily use the discrete cosine transform.

While the above three conventional techniques have the advantage that blocking effects resulting from the block coding can be reduced, they have the disadvantages of a complex circuit configuration and an increased amount of processing. Further, since the block coding is still performed, it is difficult to completely eliminate blocking effects and errors occur at the same positions as long as the blocking (segmentation) is performed in the same manner. Therefore, in the above three techniques, there necessarily occurs accumulation of blocking errors when coding and decoding are repeatedly performed on the same image. This problem should be solved, because if coding is performed to transmit and store an image, coding and decoding are repeatedly applied to the same image.

Further, the above three conventional techniques cannot accommodate blocking effects that occur when the hierarchical coding (described below) is performed with blocks having common block boundaries.

The hierarchical coding is one of the coding schemes which were discussed, to provide an international standard of the color still picture coding scheme, in JPEG (Joint Photographic Experts Group) that is a joint activity of ISO and CCITT. (For example, see Yasuda, "International Standard of Multi-media coding" (in Japanese), pp. 14–47, Maruzen Co., Ltd.) As shown in FIG. 15, in the hierarchical coding scheme, an input image I(n) passes through down sampling filters (DSFs) 71 to become a final reduced image I(0), in which processing the number of pixels is reduced to ½, ¼, . . . . The reduced image may have a reduced area or a reduced resolution with the area kept the same. Symbols E(0) to E(n) denote coders at respective stages the hierarchical structure. FIG. 16 shows a configuration of a coder E(i) at a certain hierarchical stage. A difference image between an input image i(i) to this stage and an image obtained by enlarging a locally decoded image R(i−1) of the preceding stage by an up sampling filter 81 is coded by a discrete cosine transform coder 83 and then decoded by a local decoder 84, to supply an image R(i) to an coder E(i+1) of the next stage. Further, the discrete cosine transform coder 83 outputs compressed data C(i) of the stage.

The reduced image I(0) itself is coded in the first stage, and the difference image is coded in the second stage onward. FIG. 17 shows a positional relationship between two reduced images. Since coding blocks of the (i−1)th-stage image and coding blocks (hatched in FIG. 17) of the ith-stage image have common block boundaries, blocking errors are emphasized by repeated discrete cosine transform operations. Where the resolution is maintained, the (i−1)th-stage image has an area including four blocks.

SUMMARY OF THE INVENTION

An object of the present invention is to produce a decoded image having reduced blocking effects even when block coding and decoding operations are repeatedly performed on the same image.

According to the invention an image coding apparatus comprises:

image blocking means for dividing an input image into block images each having a predetermined shape and size;

blocking position moving means for moving boundaries of the block images to different positions every time a coding operation is performed; and coding means for coding the block images to produce coded image information.

Further, according to the invention, an image decoding apparatus for decoding coded image information including coded block images each having a predetermined shape and size, and block boundary information indicating boundaries of the block images, comprises:

means for decoding the coded image information;

means for detecting the boundaries of the block images from the block boundary information of the coded image information; and means for reconstruct an image based on the detected block boundary information to produce decoded image information.

With the above constitution, in which in the coding operation the blocking is performed such that block images to be cut out from an input image is varied, that is, the block boundaries move, from one coding operation to another, when the coding and decoding operations are repeated. Therefore, blocking error positions are dispersed, and blocking effects can thereby be reduced.

DESCRIPTION OF THE PREFERRED EMBODIMENTS

Embodiments of the present invention will be described with reference to the accompanying drawings.

Figure 1:
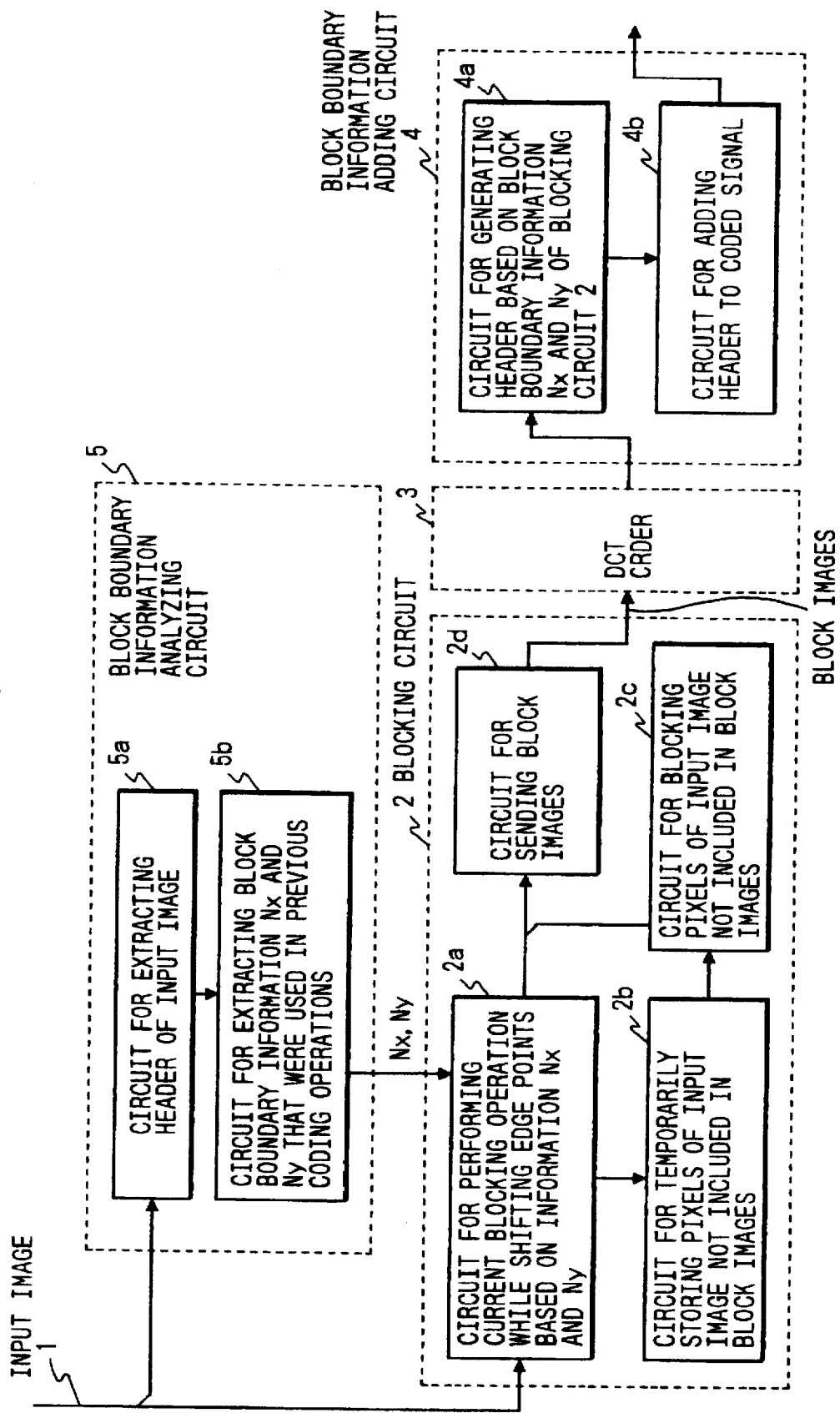
FIG. 1 shows a general configuration of an image coding apparatus according to a first embodiment of the present invention.
Figure 2:
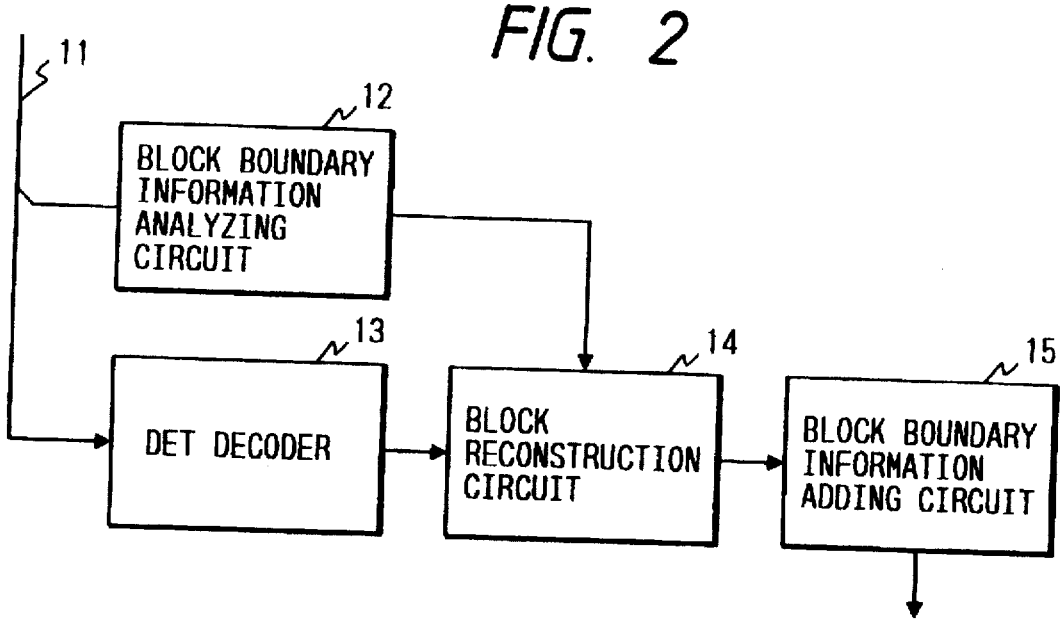
FIG. 2 shows a general configuration of an image decoding apparatus according to the first embodiment of the invention.

FIGS. 1 and 2 show a first embodiment of the invention, in which it is assumed that block coding and decoding is repeatedly performed on the same image.

FIG. 1 shows a general configuration of an image coding apparatus according to the first embodiment. Reference numerals 1 and 2 denote an input signal and a blocking circuit, respectively. A discrete cosine transform coder 3 codes, by the discrete cosine transform on a block-by-block basis, block image signals produced by the blocking circuit 2. A block boundary information adding circuit 4 adds information on a blocking start point to a header of a coded signal. A block boundary information analyzing circuit 5 analyzes a start point of the preceding blocking operation when receiving a preceding coded image.

FIG. 2 shows a general configuration of an image decoding apparatus according to the first embodiment. Reference numeral 11 denotes an input coded signal. A block boundary information analyzing circuit 12 analyzes block boundary information that is written in a header of the input coded signal 11. A discrete cosine transform decoder 13 decodes the coded signal on a block-by-block basis. A block reconstruction circuit 14 reconstructs an image from the block coded images. A block boundary information adding circuit 15 adds block boundary information to the decoded image.

Figure 3A:
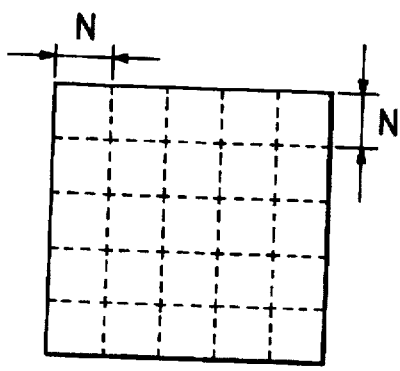
FIGS. 3(a)–3(c) illustrate the operation of a blocking circuit of the image coding apparatus of FIG. 1.
Figure 3B:
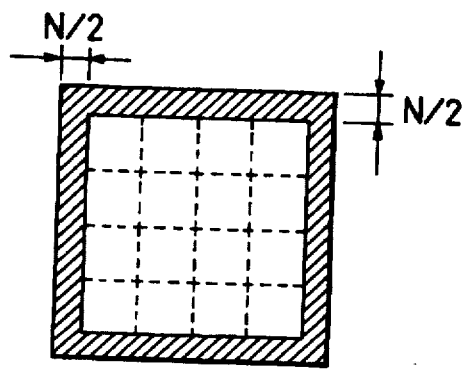
Figure 3C:
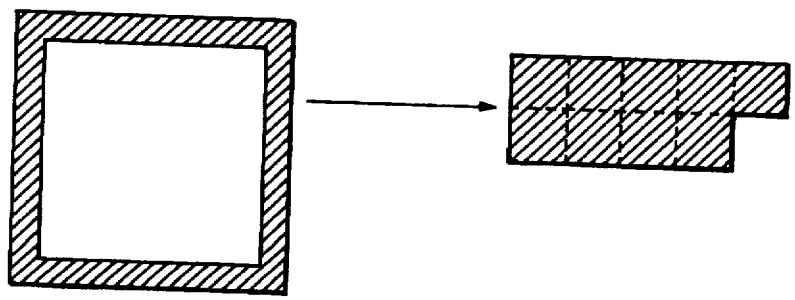

The operation of the image coding apparatus will be described with reference to FIG. 1. The block boundary information analyzing circuit 5 analyzes the block boundary information of the input signal 1. The analyzing circuit 5 consists of a circuit 5a for extracting the header of the input signal 1 and a circuit 5b for extracting, from the header, block boundary information Nx and Ny that were used in previous coding operations (a past history). The block boundary information indicates how an image was divided into block images. The blocking circuit 2 blocks (segments) the input image (input signal 1) based on the analysis result of the block boundary information analyzing circuit 5. The blocking circuit 2 consists of a circuit 2a for performing a current blocking operation while shifting edge points based on the block boundary information Nx and Ny, a circuit 2b for temporarily storing pixels of the input image not included in block images, a circuit 2c for blocking the pixels of the input image not included in the block images, and a circuit 2d for combining the images output from the circuits 2a and 2b and sequentially sending combined block images to the discrete cosine transform decoder 3. The circuit 2a has a means for generating boundary information indicating blocking regions and non-blocking regions based on the block boundary information Nx and Ny, and adds the thus-generated boundary information to the input image. Where no block boundary information is added to the input image, the circuit 2a generates predetermined initial boundary information. For example, in the case of blocking an image as shown in FIG. 3(a) into block images each having N×N pixels, for block boundaries being edge points of the image, the blocking circuit 2 removes peripheral pixels of a width of, for instance, N/2 as shown in FIG. 3(b). In this case, the start point of the blocking operation becomes (N/2, N/2). The pixels hatched in FIG. 3(b) are temporarily stored in the circuit 2b such as a memory, and then converted by the circuit 2c to blocks each having N×N pixels as shown in FIG. 3(c). This conversion is preferably performed by sequentially entering the pixels of the hatched portions into the blocks while raster-scanning those. But any method can be employed as long as it allows reconstruction of block images.

The block image signals produced by the blocking circuit 2 are sent to the discrete cosine transform coder 3, where they are coded. This coding operation is sequentially performed on the central block images and the block images as collections of the peripheral portions. The block boundary information adding circuit 4 adds information of the blocking start point (N/2, N/2) to the coded signal as its header information. The adding circuit 4 consists of a circuit 4a for generating the header as a history that is in accordance with the block boundary information Nx and Ny based on the coded signal sent from the coder 3, and a circuit 4b for adding the thus-generated header, which is to be used in the future coding operation, to the coded signal of the input image.

Figure 4:
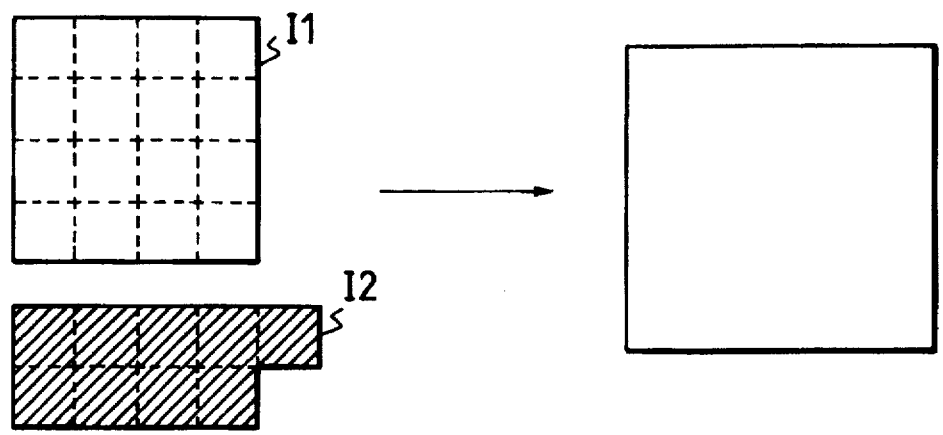
FIG. 4 illustrates the operation of a block reconstruction circuit of the image decoding apparatus of FIG. 2.

The operation of the image decoding apparatus will be described with reference to FIG. 2. The input signal 11 is supplied to the block boundary information analyzing circuit 12. The analyzing circuit 12 obtains the blocking start point and sends the block boundary information to the block reconstruction circuit 14. Further, the input coded signal 11 is decoded by the discrete cosine transform decoder 13, and sent to the block reconstruction circuit 14. As shown in FIG. 4, the block reconstruction circuit 14 reconstructs a decoded image based on the central block images I1 and the peripheral block images I2, which have been obtained by sequentially decoding the input coded signal 11, and the block boundary information, i.e., the information of the blocking start point (N/2, N/2), contained by the header of the input coded signal 11. Further, the block boundary information adding circuit 15 adds the block boundary information to the header of the decoded image. The block boundary information is added because the information of the boundary positions is required in again coding the decoded image.

With the above constitution, new blocks can be constructed so that a block boundary of the preceding coding is located in the inside of a new block in the case of repeatedly coding the same image. Since block boundaries do not remain at the same positions, the positions of blocking errors can be dispersed. This will be explained below in detail.

A one-dimensional model is employed here for simplicity of discussion. According to the sampling theorem, a continuous waveform f(t) having a frequency spectrum of a limited width W can be expressed as follows by values of f(t) obtained by sampling at intervals ½W:

$$f(t) = \sum_{n=-\infty}^{\infty} f\left(\frac{n}{2W}\right) \frac{\sin\pi(2Wt-n)}{\pi(2Wt-n)}$$

However, in the block coding scheme, it is expressed as $$f'(t) = \sum_{n=0}^{N-1} f\left(\frac{n}{2W}\right) \frac{\sin\pi(2Wt-n)}{\pi(2Wt-n)}$$

where N is a block length of image segmentation. A difference between f(t) and f'(t) corresponds to an error caused by the block coding.

Figure 5:
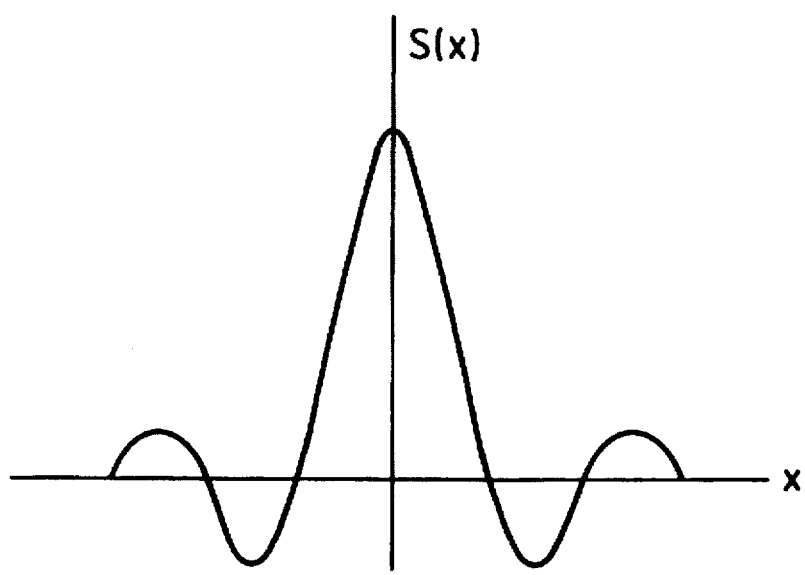
FIG. 5 is a graph showing a function $S(x)=\sin\pi x/\pi x$.
Figure 6:
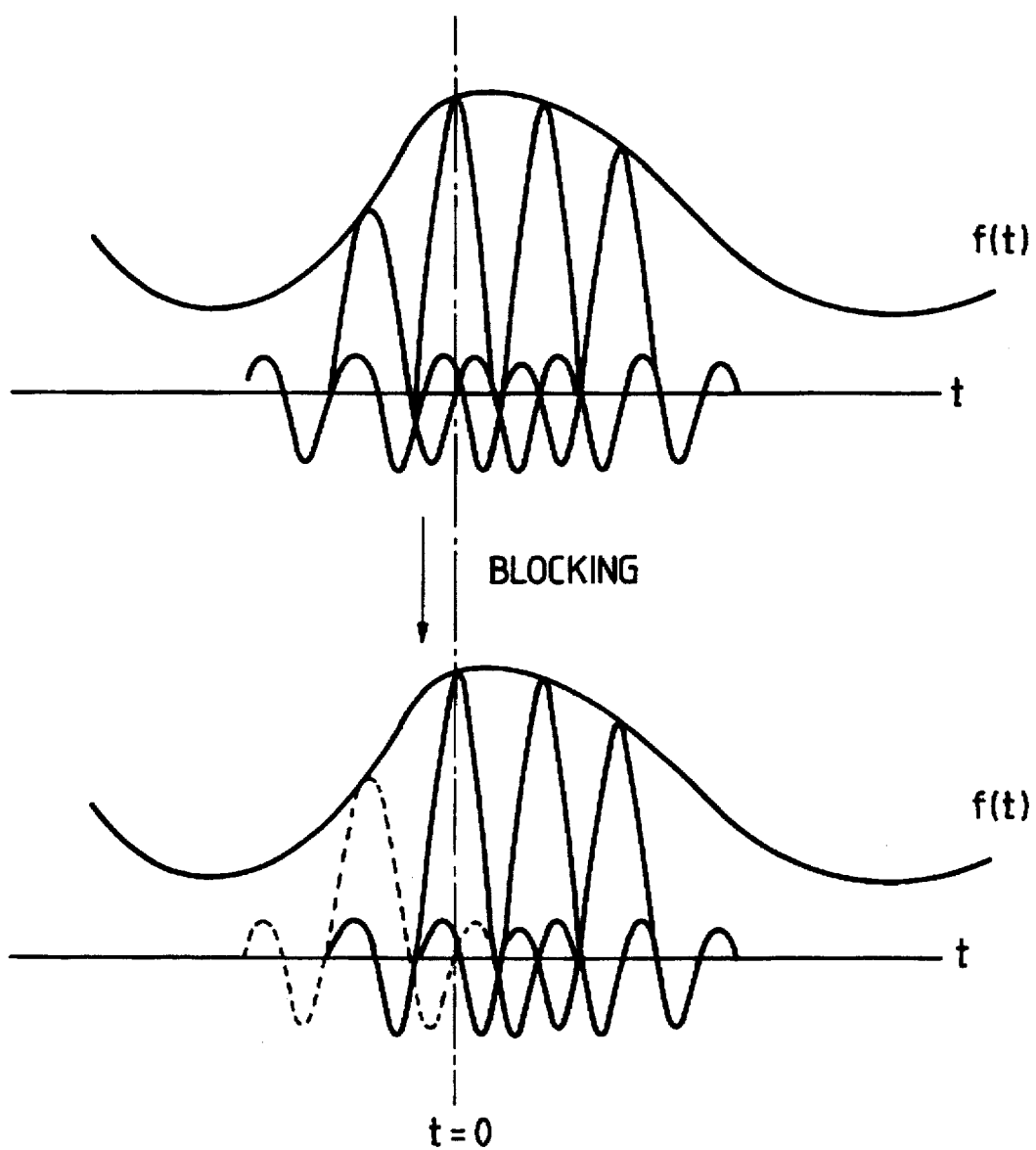
FIG. 6 illustrates how blocking effects occur.

By the way, the function $$S(x) = \frac{\sin\pi x}{\pi x}$$

has a shape as shown in FIG. 5, in which the extremes take larger absolute values for smaller absolute values of x. Therefore, an edge point (t=0 or N−1) of a block may have a large error because it does not include a portion of S(x) having a small absolute value of x. That is, errors will occur on block boundary lines more frequently as illustrated in FIG. 6. Assume here that a block boundary is located at t=0. As a result of block coding, the waveform f(t) loses a frequency component indicated by a dashed line in the lower part of FIG. 6, to suffer from a blocking error. Blocking errors caused by block coding is a sum of functions as indicated by the dashed line in the lower part of FIG. 6, which sum likely has a larger value as the position approaches the block edge.

Figure 7:
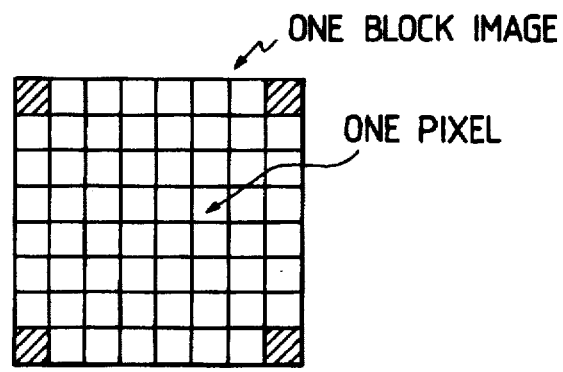
FIG. 7 illustrates how blocking errors are concentrated at portions which are located on both of horizontal and vertical block boundaries.
Figure 8:
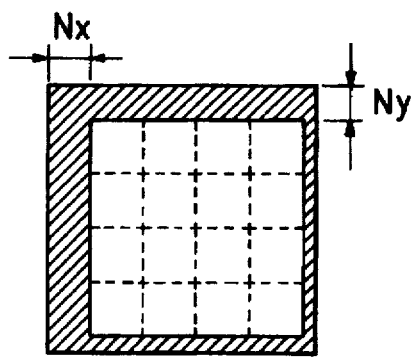
FIG. 8 illustrates the operation of another blocking circuit.

When the coding and decoding are performed repeatedly, the above errors are superposed on each other and thereby emphasized. Further, actually the blocking operation is performed two-dimensionally, which is equivalent to two times of execution of the one-dimensional blocking operation (horizontally and vertically). As a result, blocking errors tend to appear at hatched portions in FIG. 7, each of which is located on both of the horizontal and vertical block boundaries.

If the block boundary is shifted, f'(t) is expressed, for instance, as $$f'(t) = \sum_{n=-\frac{N}{2}}^{\frac{N}{2}-1} f\left(\frac{n}{2W}\right) \frac{\sin\pi(2Wt-n)}{\pi(2Wt-n)} .$$

In this case, error frequently appear at t=−2/N and 2/N−1. Thus, error positions can be dispersed, and accumulation of blocking errors, which deteriorates quality of a reproduced image, can be avoided.

The technique according to the invention can be applied to the conventional techniques described above, because no contradiction exists between those techniques. Further, the above advantage can be obtained simply by adding a memory for storing the hatched image portions in FIG. 3. Further, it is apparent that the invention can be applied to any block coding schemes.

Although the above embodiment is described of the case in which each block consists of N×N pixels, the invention is not limited to such a case. It is also apparent that the block shape is not limited to a rectangle.

Although in the above embodiment the peripheral pixels of N/2 in width are removed in the blocking operation, Nx and Ny ($0 \leq Nx$, $Ny \leq N$) may be determined so that the central block images deviate from the center of the input image.

Where the header of the input image has the block boundary information of the preceding coding and decoding operations, Nx and Ny may be set at values different from those of the preceding block boundaries. Further, the shift amount of the ith coding operation may be predetermined to be, for instance, Nx(i) and Ny(i).

In the above embodiment, an image or codes are analyzed by the block boundary information analyzing circuits 5 and 12 of the image coding apparatus (FIG. 1) and the image decoding apparatus (FIG. 2), and the block boundary information is added to an image or codes by the block boundary information adding circuits 4 and 15. However, in systems for storage, it is not necessary to add the block boundary information to an image or codes, and may be stored separately.

Although in the above embodiment the discrete cosine transform coder 3 is employed as the coder for coding an image on a block-by-block basis, any other coding scheme may be employed as long as it is a block coding scheme. For example, the block approximation scheme, vector quantizing and other transform type coding schemes may be employed.

Although in the above embodiment only the pixels of the hatched portions in FIG. 3(b) are temporarily stored in the memory, the entire input image may be stored.

Figure 9:
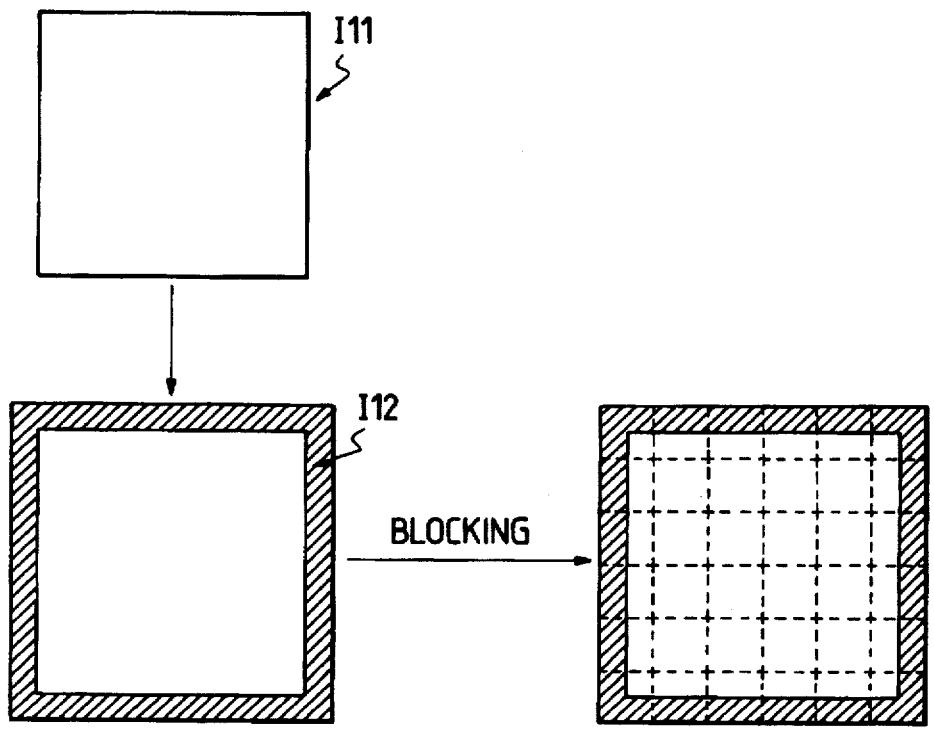
FIG. 9 illustrates the operation of a further blocking circuit.

In the above embodiment, the pixels left as a result of the block boundary movement are collected into blocks as shown in FIG. 3(c). As an alternative, the blocking operation may be performed after adding pixels 112 (hatched in FIG. 9) having values equal to edge point values, an average of values of an input image 111, a predetermined value such as 0, or other values outside the input image 111.

Although in the above embodiment the block boundary information is added to the header of a decoded image, this operation may be omitted, in which case the blocking in the coding operation is performed independently of the preceding boundary positions and the apparatus of the invention is kept compatible with conventional apparatuses.

Further, the conventional overlap scheme, filtering scheme or LOT scheme may be combined with the block coding section of the above embodiment.

Next, an image coding apparatus and an image decoding apparatus according to a second embodiment of the invention will be described with reference to FIGS. 10 and 11.

Figure 10:
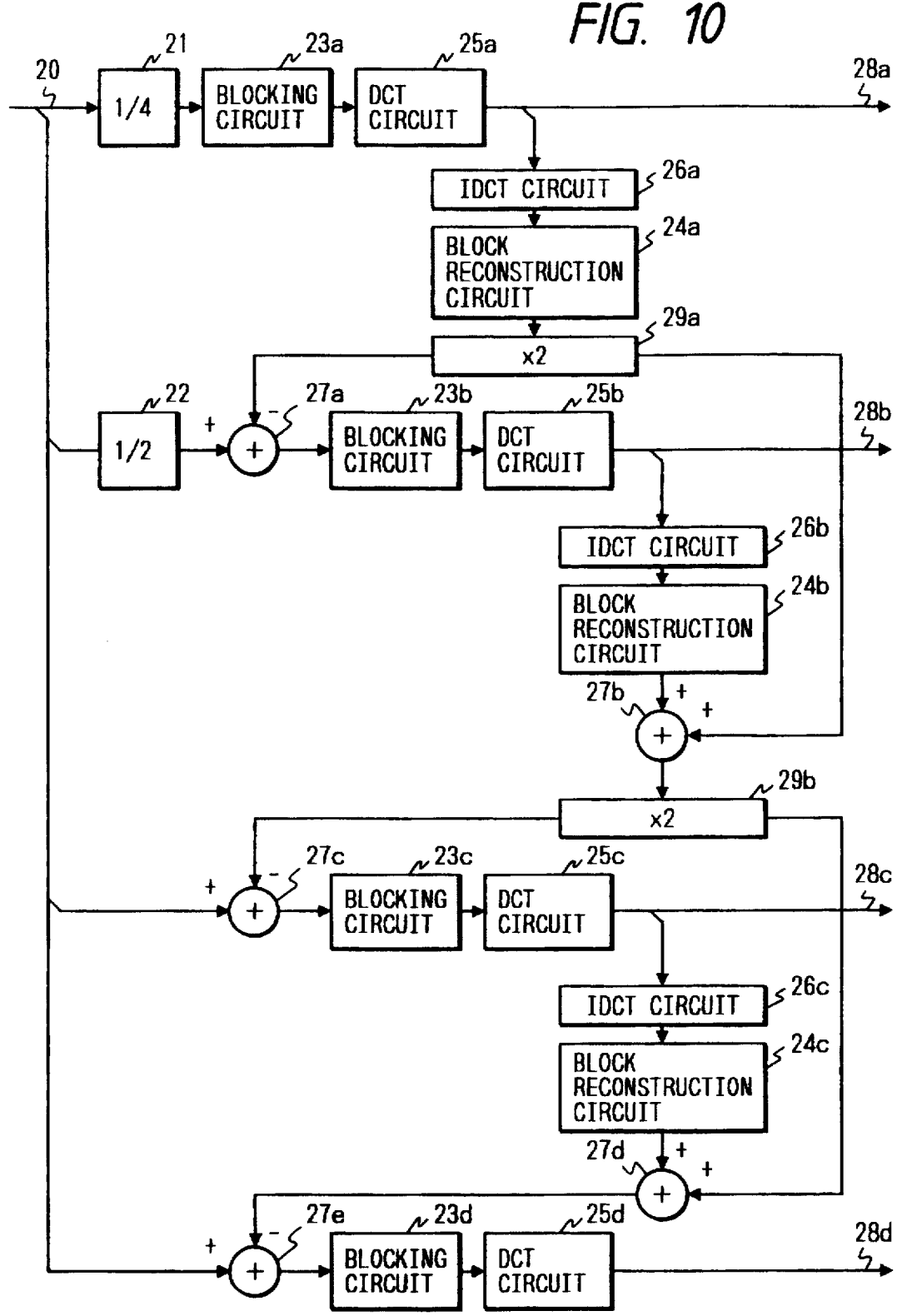
FIG. 10 shows a general configuration of an image coding apparatus according to a second embodiment of the invention.

FIG. 10 shows a general configuration of the image coding apparatus according to the second embodiment. Reference numeral 20 denotes an input image signal. A down sampling filter 21 reduces the input image into ¼, and a down sampling filter 22 reduces the input image into ½.

Reference symbols 23a–23d and 24a–24d denote blocking circuits and block reconstruction circuits as described in the first embodiment, respectively. Discrete cosine transform circuits 25a–25d code block images by performing the discrete cosine transform. Inverse discrete cosine transform circuits 26a–26c decode the images coded by the discrete cosine transform circuits 25a–25c, respectively. Adders 27a–27c add together pixel values of the same portions of images having the same area. Each of symbols 28a–28d denotes coded information that has been obtained by hierarchical coding. Up sampling filters 29a and 29b double the areas of images.

In the image coding apparatus shown in FIG. 10, the blocking circuits 23a–23d of the first embodiment are provided upstream of the discrete cosine transform circuits 25a–25d of the above-described discrete cosine transform type hierarchical coding scheme which has been discussed in JPEG. Further, the block reconstruction circuits 24a–24c of the first embodiment are provided down stream of the discrete cosine transform circuits 26a–26c of the same scheme. The blocking circuit 23a and the block reconstruction circuit 24a use the same block boundary information. Similarly, the blocking circuit 23b and the block reconstruction circuit 24b use the same block boundary information, the blocking circuit 23c and the block reconstruction circuit 24c use the same block boundary information, and the blocking circuit 23d and a block reconstruction circuit 31d (see FIG. 11) use the same block boundary information. The blocking circuits 23a–23d use different block boundary information.

Figure 11:
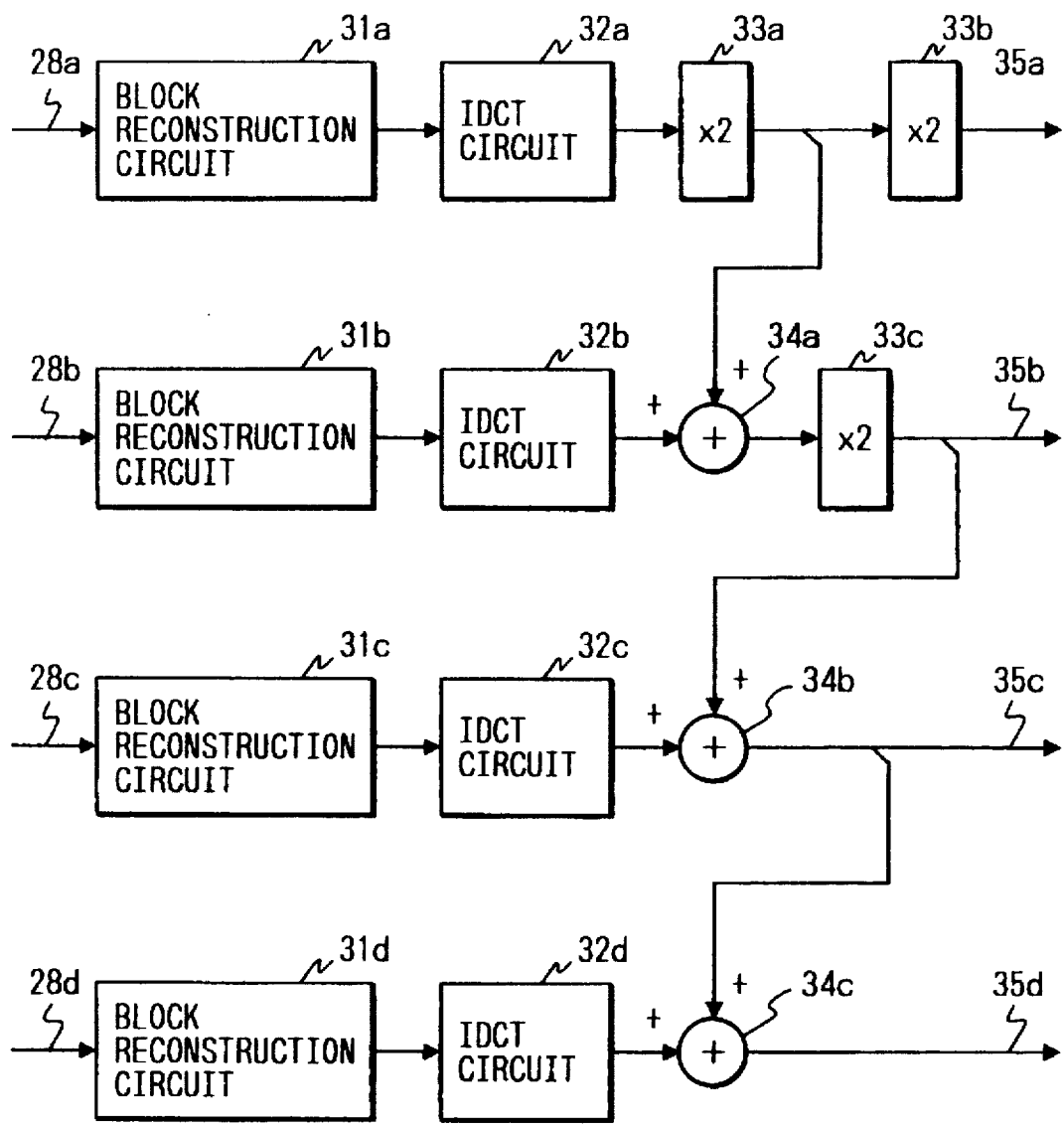
FIG. 11 shows a general configuration of an image decoding apparatus according to the second embodiment of the invention.
Figure 12:
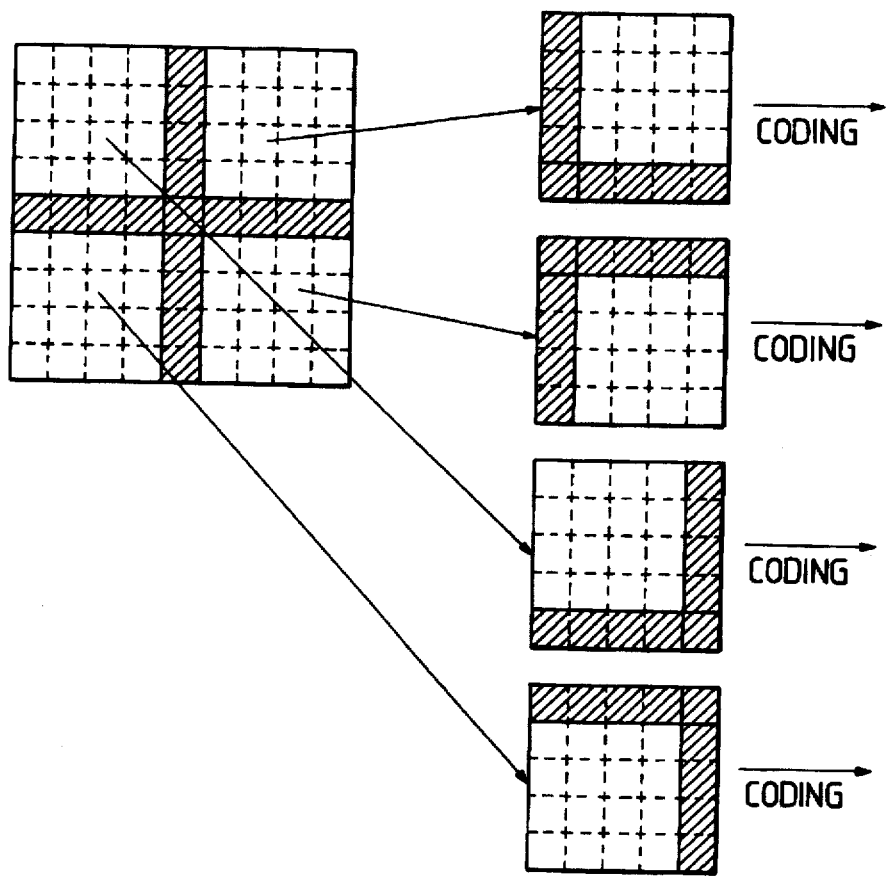
FIG. 12 illustrates the operation of a conventional image coding apparatus of the overlap scheme.
Figure 13:
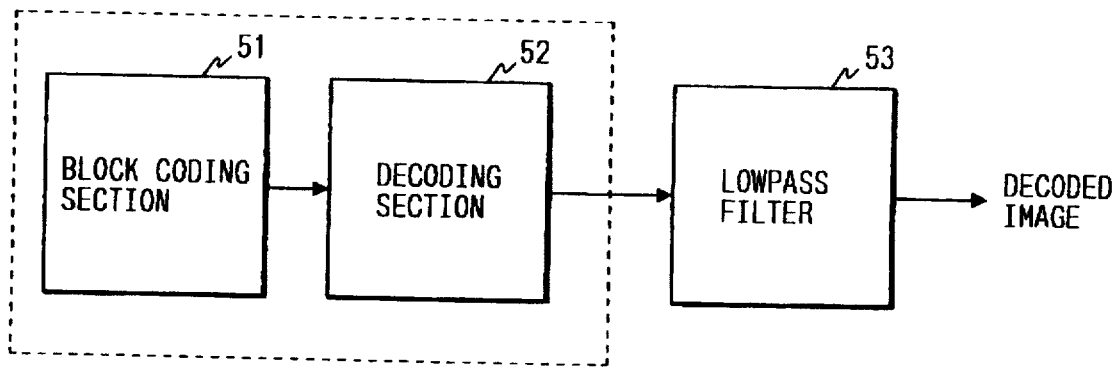
FIG. 13 shows a general configuration of a conventional image coding apparatus of the filtering scheme.
Figure 14A:
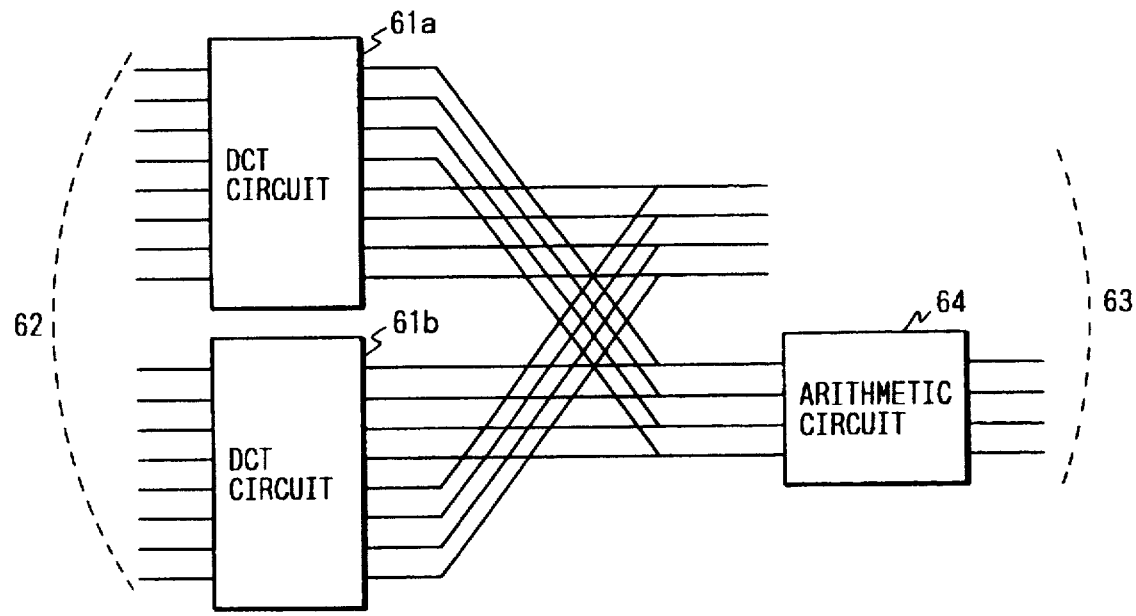
FIGS. 14(a) and 14(b) show a general configuration of a conventional image coding apparatus of the LOT scheme.
Figure 14B:
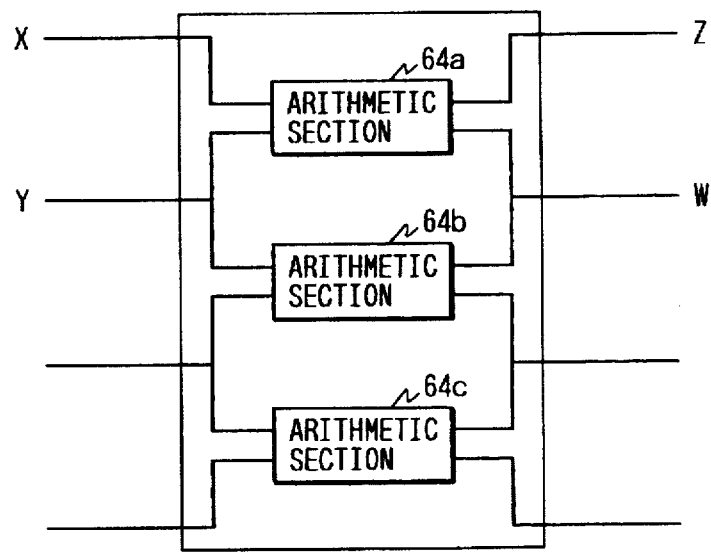
Figure 15:
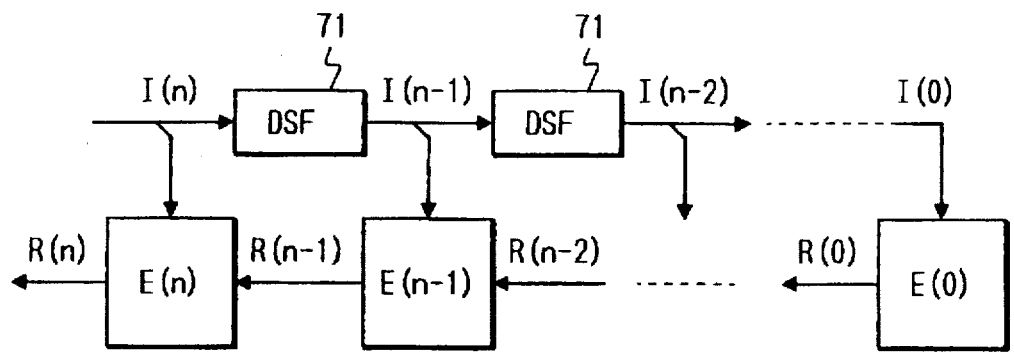
FIG. 15 shows a general configuration of a coding apparatus of the hierarchical coding scheme.
Figure 16:
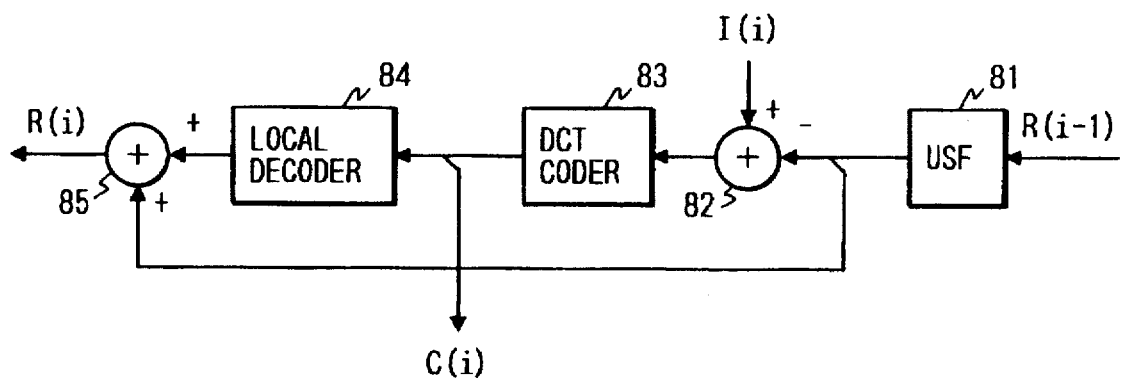
FIG. 16 shows a configuration of a coder of each hierarchical stage of the apparatus of FIG. 15.
Figure 17:
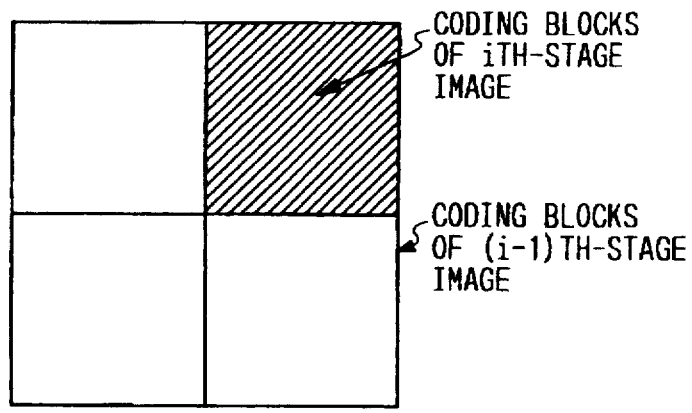
FIG. 17 illustrates a relationship between coding blocks of images of adjacent hierarchical stages in the hierarchical coding scheme.

FIG. 11 shows a general configuration of the image decoding apparatus according to the second embodiment. Block reconstruction circuits 31a–31d respectively receive the hierarchically decoded information 28a–28d sent from the image coding apparatus of FIG. 10. Inverse discrete cosine transform circuits 32a–32d decode the reconstructed images. Up sampling filters 33a–33c double the areas of images. Adders 34a–34c add together pixel values of the same portions of images having the same area. Symbols 35a–35d denote decoded images of respective hierarchical levels. The block reconstruction circuits, the inverse discrete cosine transform circuits and the up sampling filters used in this image decoding apparatus has the same constitution as those used in the image coding apparatus of FIG. 10.

The operations of the image coding apparatus and the image decoding apparatus will be described below with reference to FIGS. 10 and 11.

In the image coding apparatus of FIG. 10, the input image signal 20 is branched into the four paths.

The input image signal 20 on the first path is sampled by the down sampling filter 21 so that the image size is reduced ¼. The sampled signal is blocked by the blocking circuit 23a in the same manner as in the first embodiment, and the block images are coded by the discrete cosine transform circuit 25a, to become the coded information 28a. The coded information 28a output from the discrete cosine transform circuit 25a is decoded by the inverse discrete cosine transform circuit 26a, and then processed by the block reconstruction circuit 24a, to restore its original image form. The size of the decoded image is doubled by the up sampling filter 29a.

The input image signal 20 on the second path is sampled by the down sampling filter 22 so that the image size is reduced to ½. The sampled signal is input to the adder 27a, where the signal from the up sampling filter 29a is subtracted from the signal from the down sampling filter 22. The difference signal is blocked by the blocking circuit 23b, and coded by the discrete cosine transform circuit 25b, to become the coded information 28b. The coded information 28b output from the discrete cosine transform circuit 25b is decoded by the inverse discrete cosine transform circuit 26b, and processed by the block reconstruction circuit 24b, to restore its original image form. The decoded image from the block reconstruction circuit 24b is added to the output of the up sampling filter 29a by the adder 27b, and the size of the sum signal is doubled by the up sampling filter 29b.

The input image signal 20 on the third path is input to the adder 27a, where the signal from the up sampling filter 29b is subtracted from the input signal 20. The difference signal is blocked by the blocking circuit 23c, and the block images are coded by the discrete cosine transform circuit 25c, to become the coded information 28c. The coded information 28c output from the discrete cosine transform circuit 25c is decoded by the inverse discrete cosine transform circuit 26c, and then processed by the block reconstruction circuit 24c, to restore its original image form. The decoded image output from the block reconstruction circuit 24c is added to the signal from the up sampling filter 29b by the adder 27d.

The input image signal 20 on the fourth path is input to the adder 27e, where the signal from the adder 27d is subtracted from the input signal 20. The difference signal is blocked by the blocking circuit 23d, and the block images are coded by the discrete cosine transform circuit 25d, to become the coded information 28d.

Thus, the hierarchically coded information 28a–28d is obtained by the image coding apparatus of FIG. 10.

In the image decoding apparatus of FIG. 11, the hierarchically coded information 28a–28d from the image coding apparatus of FIG. 10 is processed by the block reconstruction circuits 31a–31d to restore its original image form in the respective hierarchical levels, and then decoded by the inverse discrete cosine transform circuits 32a–32d. While correct positional relationships among the respective images are maintained by the up sampling filters 33a–33c, pixel values of the same portions of the respective images are added together by the adders 34a–34c. Thus, the decoded images 35a–35d of the respective hierarchical levels are obtained.

Although in the above embodiment the blocking circuits 23a–23d use the different block boundary information, they may use the same block boundary information.

Although in the above embodiment the discrete cosine transform coders are employed as the coders for coding images on a block-by-block basis, any other coding scheme may be employed as long as it is a block coding scheme. For example, the block approximation scheme, vector quantizing and other transform type coding schemes may be employed.

Although in the above embodiment the number of stages of the hierarchical coding operation is four, it is apparent that the number of stages is not limited to four.

Further, the conventional overlap scheme, filtering scheme or LOT scheme may be combined with the block coding sections of the above embodiment.

As described above, according to the invention, block images to be cut out from an input image can be varied when the block coding operations are repeated. Therefore, the emphasis of blocking effects that would otherwise occur when the same block coding and decoding operations are repeated can be suppressed. To implement the invention, the only addition required is the memory for storing pixels left outside the block images. Therefore, the circuit configuration does not become complex and there is no increase of the amount of processing. Since the invention can be implemented simply by modifying the blocking circuit portion of conventional block coding apparatus, it can be applied to any block coding schemes. In addition, the invention can be combined with conventional methods of reducing blocking effects.

What is claimed is:

1. An image coding apparatus for performing a block coding operation for an original image a plurality of times to compress the original image, said image coding apparatus comprising:

means for dividing an input image into first and second non-overlapping regions that together cover the entire input image, and for generating block boundary information indicating boundaries between the first and second regions, the input image being a coded image obtained by coding the original image one or more times;

means for blocking the first region into first block images each having a predetermined size;

means for blocking the second region into second block images having the predetermined size;

means for combining the first and second block images;

means for coding the combined block images to produce coded image information;

means for adding block boundary information to the coded image information; and the input image being divided into the first and second regions such that no line segment of boundaries of the first and second regions to be coded at one time to compress the original image is aligned with boundaries of the first and second regions to be coded at other times to compress the original image.

2. An image coding apparatus for performing a block coding operation for an original image a plurality of times to compress the original image, said image coding apparatus comprising:

means for adding a peripheral image to an input image, dividing an image consisting of the input image and the peripheral image into first and second non-overlapping regions that together cover the entire input image, and generating block boundary information indicating boundaries between the first and second regions, the input image being a coded image obtained by coding the original image one or more times;

means for blocking the first region into first block images each having a predetermined size;

means for blocking the second region into second block images having the predetermined size;

means for combining the first and second block images;

means for coding the combined block images to produce coded image information;

means for adding block boundary information to the coded image information; and the input image being divided into the first and second regions such that no line segment of boundaries of the first and second regions to be coded at one time to compress the original image is aligned with boundaries of the first and second regions to be coded at other times to compress the original image.

3. The image coding apparatus of claim 1, wherein the first region occupies a central portion of the input image and the second region occupies a peripheral portion of the input image.

* * * * *